United States Patent [19]

Kyogoku et al.

[11] Patent Number: 4,929,980
[45] Date of Patent: May 29, 1990

[54] DOCUMENT SUPPORT TABLE WITH LUBRICANT AND METHOD FOR FORMING THE SAME

[75] Inventors: Tetsuo Kyogoku; Masamitsu Ishiyama; Masayuki Mino, all of Osaka, Japan

[73] Assignee: Minolta Camera Kabushiki Kaisha, Japan

[21] Appl. No.: 281,253

[22] Filed: Dec. 7, 1988

[30] Foreign Application Priority Data

Dec. 10, 1987 [JP] Japan .................. 62-312595
Dec. 10, 1987 [JP] Japan .................. 62-312596

[51] Int. Cl.$^5$ ............................................ G03B 27/62
[52] U.S. Cl. ............................................ 355/75
[58] Field of Search ................. 355/75; 528/401; 252/8.8, 58; 271/264

[56] References Cited

U.S. PATENT DOCUMENTS

| | | | |
|---|---|---|---|
| 3,844,552 | 10/1974 | Bleau et al. | 355/75 X |
| 4,257,587 | 3/1981 | Smith | 271/264 X |
| 4,310,588 | 1/1982 | Bareel | 528/401 X |
| 4,803,005 | 2/1989 | Juhlke et al. | 252/58 |

FOREIGN PATENT DOCUMENTS

| | | | |
|---|---|---|---|
| 118121 | 10/1978 | Japan | 355/75 |
| 58-55346 | 4/1983 | Japan | |
| 58-176601 | 10/1983 | Japan | |
| 293236 | 12/1987 | Japan | 355/75 |

OTHER PUBLICATIONS

I.B.M. Technical Disclosure Bulletin, Jul. 1975, vol. 18, No. 2, p. 362.

Primary Examiner—Donald A. Griffin

[57] ABSTRACT

A document support member for use in a copier and the like upon which an original document is placed.

A transparent substrate has a transparent surface-layer formed on the surface thereof which is provided with numerous minute spaces thereon. The said minute spaces are filled with a lubricant so as to reduce friction drag between the original document and the document support member.

13 Claims, 3 Drawing Sheets

DOCUMENT SUPPORT TABLE WITH LUBRICANT AND METHOD FOR FORMING THE SAME

BACKGROUND OF THE INVENTION

Conventionally, copy machines, document readers and the like are provided with a document support table upon which an original document is placed so as to allow scanning exposure of the original document by an optical system or reading of the original document by a charge-coupled device (CCD). A panel of transparent glass is typically used for the document support table.

More recently, the use of automatic document feeders (ADF) has become widespread, the ADF feeding the original document to an exposure reference position on the document support table, and moving the original document to a specified location after the exposure has been made. Copy machines and the like are often provided with an ADF device; when an original document is fed to the document support table, the original document comes into contact with a feed belt and friction drag is produced between said original document and the feed belt.

The original document transported by a feed belt rubs against the document support table, so as to induce friction drag therebetween which is greater than that produced between the original document and the feed belt, thereby impeding alignment of the original document with the aforesaid exposure reference position and, depending on the characteristics of the paper, causing inadequate transport of the original document. A well-known method of reducing friction drag between the original document and the document support table is the application of silicon wax, oil or like lubricant to the surface of the document support table.

In the aforesaid conventional document support table, the lubricant must be periodically applied about once every several thousand copies because the applied lubricant adheres to the original document and is gradually removed from the document support table. Further, the period between lubricant applications tends to be shortened when a high performance ADF is used, due to the increased consumption of the lubricant in correlation to the high speed of the ADF, thereby complicating maintenance.

SUMMARY OF THE INVENTION

The present invention is devised in consideration of the aforesaid elements. An object of the present invention is to provide a document support table for use in copy machines and the like, said document support table being capable of maintaining an applied lubricant over longer periods of time than can conventional means.

This object has been attained by a document support member which comprises
  a transparent substrate,
  a transparent surface layer provided with minute spaces thereon and formed on the surface of said transparent substrate, and said minute spaces are accommodated therein with lubricant to have a lubricating surface.

BRIEF DESCRIPTION OF THE DRAWINGS

These and other objects or features of the present invention will become apparent from the following description of a preferred embodiment(s) thereof taken in conjunction with the accompanying drawings, in which.

In the following description, like parts are designated by like reference numbers throughout the several drawings.

DESCRIPTION OF THE PREFERRED EMBODIMENT

First Embodiment

Figure 1:
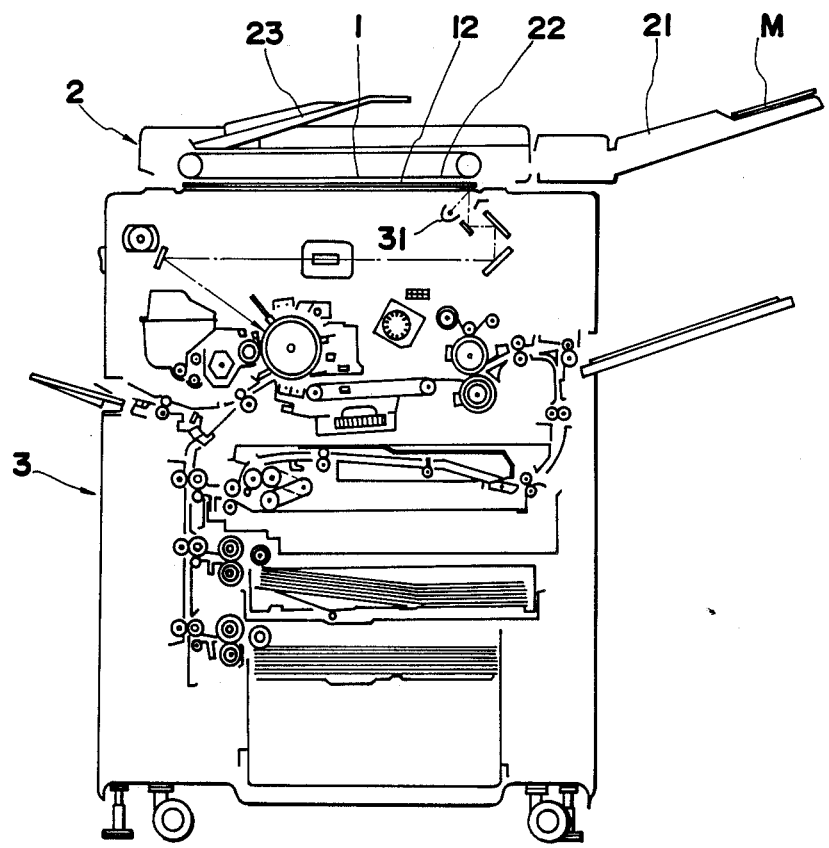
FIG. 1 is a view of the internal construction of a copy machine provided with an ADF.

FIG. 1 is a structural view showing the internal construction of a copy machine provided with ADF 2 mounted on document support table 1 of the present invention.

Figure 2:
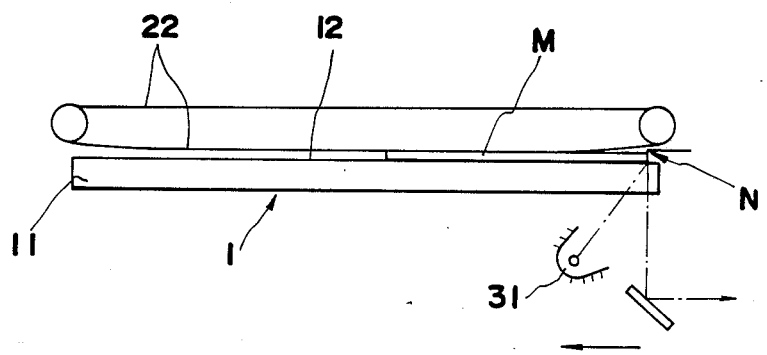
FIG. 2 is an illustration describing the mode of transport of the original document onto the document support table of the invention and the mode of scanning exposure thereon.

When the aforesaid copying machine 3 performs the copy operation, the original document "M" disposed in original document tray 21 of ADF 2 is fed sheet by sheet and transported onto the document support table 1 by feed belt 22. As shown in FIG. 2, original document "M" is aligned with and stops at exposure reference position "N," and is subjected to scanning exposure by illumination system 31.

Figure 3:
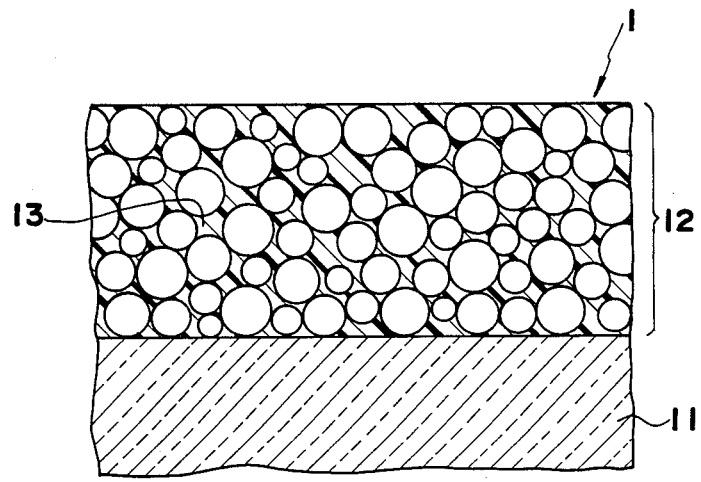
FIGS. 3-5 are partial cross-sections of embodiments of the document support table of the invention.

The present embodiment of document support table 1 essentially comprises a glass substrate 11, surface layer 12 and lubricant 13, as shown in an enlarged cross section view of the surface portion thereof in FIG. 3.

The document support table is arranged with surface layer 12 facing upward so as to be opposite the feed belt 22 of ADF 2.

Glass substrate 11 is a glass plate having a thickness of 4 mm and having silicon dioxide ($SiO_2$) as its main constituent.

Surface layer 12 is formed upon the surface of glass substrate 11 so as to comprise a single unit. Surface layer 12 is a sintering layer having a thickness of 1 to 2 $\mu$m and comprising $SiO_2$ particles having a diameter of 500 to 1,000 angstroms. Accordingly, minute spaces are formed between each of the aforesaid particles. Surface layer 12 of the present embodiment is formed in the manner described hereinafter. First, an aqueous solution is formed of 20% $SiO_2$ by weight, the $SiO_2$ comprising pulverized particles having diameters of 500 to 1,000 angstroms, and a dispersant comprising $Na_2O$ at 0.05% by weight is then introduced and mixed with said aqueous solution. Next, one surface of glass substrate 11 is entirely coated with the aqueous solution by a dip process (spinner or spray processes may also be employed). Thereafter, the $SiO_2$ is sintered by a heating process which heats to a temperature of 500° C. so as to obtain the sintered surface layer 12 upon the surface of said glass substrate 11.

The materials which comprise surface layer 12 may be transparent to a certain degree and possess a degree and possess a degree of hardness. Because the surface layer 12 is formed by sintering material on the surface of glass substrate 11, fine particles of a transparent ceramic are preferred.

Examples of useful transparent fine ceramic particles are chemical compounds such as $SiO_2$ (silica), $TiO_2$, $Al_2O_3$, $ZrO_2$, $CeO_2$, $MgO$, $Y_2O_3$, $BaCO_3$, $TaO_3$ and the like, or combinations incorporating two or more of the aforesaid compounds.

When conductive transparent fine ceramic particles are used, electrostatic attraction of the original document is prevented and triboelectric charging which accompanies the transport of said original document is also prevented.

Examples of useful chemical compounds of conductive transparent ceramic particles are $SnO_2$, $SbO_3$, $In_2O_3$ and the like, or combinations incorporating two or more of said compounds.

The diameter of the fine ceramic particles will usually be about 100 to 1,000 angstroms.

Lubricant 13 is applied to the aforesaid surface layer 12, and the lubricant 13 fills the minute spaces formed on said surface 12.

In the present embodiment, a fluorine oil (Demnum, manufactured by Daikin Industries, Ltd.) was used as the aforesaid lubricant.

Lubricant 13 must be selected so as to have a low vapor pressure such that it will not unnecessarily produce a stain pattern with a rise in temperature, and thus, a silicon oil, grease or the like may be used in lieu of fluorine.

Comparative tests were made of the document support table incorporating a lubricant as in the present embodiment and a lubricant applied to a document support table by conventional means, both tables being installed in copy machines provided with the previously described ADF, so as to comparatively determine the time period required for the lubricants to be consumed.

As a comparison with the present embodiment, a document support table was manufactured which was identical to the document support table of the present embodiment with the exception that a fluorine oil was applied to a glass substrate which had no surface layer formed thereon, with the oil being applied to a thickness of several $\mu$m.

The comparison tests were made using two copy machines wherein original documents were sequentially fed by means of an ADF, and a check was made of the number of sheets transported until misalignment of the original documents on the document support table occurred, as well as the number of sheets until a transport malfunction occurred. The results of the tests showed that while the conventional document support table transported 10,000 sheets, the document support table of the present embodiment transported 400,000 sheets, thereby confirming that the present embodiment can prolong the useful life of the lubricant appeoximately 40 fold.

Second Embodiment

Figure 4:
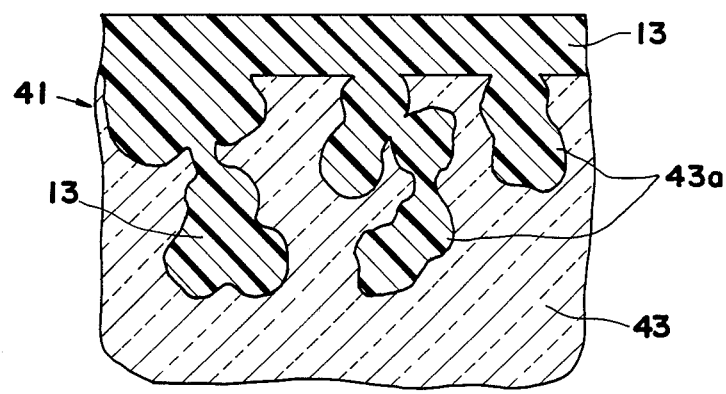
Figure 5:
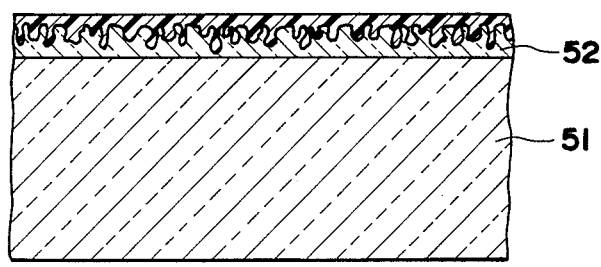

FIG. 4 shows the surface portion of another embodiment of the document support table of the present invention in enlarged cross section, a surface portion of a document support table 41 comprising a glass substrate 43 having a plurality of minute spaces 43a on the surface thereof, and a lubricant 13.

Glass substrate 43 is an alkaline glass plate comprising siliccon dioxide ($SiO_2$) as the main constituent and alkaline compounds of sodium (Na), potassium (K), calcium (Ca) and the like at a rate of about 25% by weight. The surface of glass substrate 43 is provided with a plurality of minute spaces 43a formed by extracting the alkaline ions therefrom. In the present embodiment, the minute spaces 43a are formed by immersing said alkaline glass substrate 43 in an aqueous solution containing nitric acid 20% by weight for 20 hours. The alkaline ions in the vicinity of the surface of said alkaline glass bond with the nitric acid ions, whereby the alkaline ions are separated out and a plurality of minute spaces 43a are thereby formed.

Thus, the process whereby ions are removed from the alkaline glass is referred to as "ion-extracting process" in the specifications herein.

The glass substrate 43 may be such that the alkaline glass comprises only the surface portion of said glass substrate since the minute spaces 43a formed on glass substrate 43 are formed only on the surface portion thereof. In such a case, glass substrate 43 comprises a glass substrate 51 which does not incorporate alkaline compounds or incorporates only a small quantity of same, and alkaline glass 52 is formed upon the surface of said glass substrate 51 so as to comprise a single unit. Alkaline glass 52 may be formed by a well known vacuum deposition process or by a spreading process.

Lubricant 13 is applied to the surface of glass substrate 43 by a spray application method and is adsorbed into the minute spaces 43a, thereby coating the surface of said glass substrate 43. In the present embodiment, a fluorine oil (Demnum, manufactured by Daikin Industries, Ltd.) was used as the aforesaid lubricant 13. Lubricant 13 must be selected so as to have a low vapor pressure such that it will not unnecessarily produce a stain pattern with a rise in temperature, and thus, a silicon oil, grease or the like may be used in lieu of said fluorine.

Comparative tests were made of the document support table incorporating a lubricant as in the this embodiment, and a lubricant applied to a document support table by conventional means, both with the tables being installed in the copy machines used in the first embodiment provided with the previously described ADF (FIG. 1), so as to comparatively determine the time period required for said lubricants to be consumed.

The test and evaluation methods were identical to those employed in the first embodiment. That is, a document support table 41 of the this embodiment was produced having minute spaces formed in the surface thereof, said spaces being filled with lubricant, and a document support table was produced that was identical to the aforesaid document support table of the present embodiment with the exception that it did not have minute spaces formed on the glass substrate, but did have a fluorine oil applied to the surface of said glass substrate to a thickness of several $\mu$m. Then, using copy machines provided with ADF, as shown in FIG. 1, the comparison tests were made wherein original documents were sequentially fed by means of the ADF onto the document support tables and a check was made of the number of sheets transported until misalignment of said original documents on the document support table occurred, as well as the number of sheets until a transport malfunction occurred. The results of the tests showed that while the conventional document support table transported 10,000 sheets, the document support table of the present embodiment transported 400,000 sheets, thereby confirming that the present embodiment can prolong the useful life of the lubricant approximately 40 fold.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed:

1. A document support member for use in a copier, comprising:
   a transparent substrate;
   a transparent surface layer formed on the surface of said transparent substrate, said surface layer being formed by spreading fine ceramic particles on said transparent substrate and subsequently sintering said fine ceramic particles to thereby form numerous minute spaces on said surface layer; and
   a lubricant filling said numerous minute spaces to provide a thin lubricant layer.

2. A document support member of claim 1, wherein said fine ceramic particles are made of one or more ceramic compounds selected from the group consisting of $SiO_2$, $TiO_2$, $Al_2O_3$, $ZrO_2$, $CeO_2$, MgO, $Y_2O_3$, $BaCO_3$ and $Ta_2O_3$.

3. A document support member of claim 2, wherein said lubricant is fluorooil.

4. A document support member of claim 3, wherein said alkaline glass includes one or more alkaline metals selected from the group consisting of Na, K and Ca.

5. A document support member of claim 1, wherein said fine ceramic particles are formed of one or more electrically conductive ceramic compounds selected from the group consisting of $SnO_2$, $Sb_2O_3$ and $In_2O_3$.

6. A document support member of claim 5, wherein said lubricant is fluorooil.

7. A document support member of claim 1, wherein said lubricant is fluorooil.

8. A document support member for use in a copier; comprising:
   a transparent substrate;
   a transparent surfce layer formed on the surface of said transparent substrate, said surface layer being an alkaline glass and the surface of said alkaline glass being treated with ion-extracting to thereby form numerous minute spaces on said surface layer; and
   a lubricant filling said numerous minute spaces to provide a thin lubricant layer.

9. A method for forming a document support member for use in copier, comprising the steps of:
   making an aqueous solution including fine ceramic particles;
   coating a transparent substrate with said aqueous solution;
   heating said transparent substrate coated with said aqueous solution to sinter said ceramic particles, thereby producing a sintered transparent substrate having numerous minute spaces; and
   applying a lubricant to said numerous minute spaces of said sintered transparent substrate.

10. A method according to claim 9, wherein said fine ceramic particles are made of one or more ceramic compounds selected from the group consisting of $SiO_2$, $TiO_2$, $Al_2O_3$, $ZrO_2$, $CeO_2$, MgO, $Y_2O_3$, $BaCO_3$ and $Ta_2O_3$.

11. A method according to claim 9, wherein said fine ceramic particles are made of one or more electrically conductive ceramic compounds selected from the group consisting of $SnO_2$, $Sb_2O_3$ and $In_2O_3$.

12. A method according to claim 9, wherein said lubricant is fluorooil.

13. A method for forming a document support member for use in copier comprising the steps of:
   making a glass substrate including, at least a portion thereof, an alkaline glass composition;
   ion-extracting alkaline ion from said glass substrate so as to produce an ion-extracted glass substrate having numerous minute spaces thereon; and
   applying a lubricant to said numerous minute spaces of said ion-extracted glass substrate.

* * * * *